United States Patent
Si

(10) Patent No.: US 12,273,918 B2
(45) Date of Patent: Apr. 8, 2025

(54) METHOD AND APPARATUS FOR ADAPTING A CHANNEL SENSING THRESHOLD

(71) Applicant: Samsung Electronics Co., Ltd., Suwon-si (KR)

(72) Inventor: Hongbo Si, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/501,869

(22) Filed: Nov. 3, 2023

(65) Prior Publication Data

US 2024/0090027 A1 Mar. 14, 2024

Related U.S. Application Data

(63) Continuation of application No. 17/929,658, filed on Sep. 2, 2022, now Pat. No. 11,812,469, which is a
(Continued)

(51) Int. Cl.
*H04W 74/0808* (2024.01)
*H04L 5/00* (2006.01)
(Continued)

(52) U.S. Cl.
CPC ....... *H04W 74/0808* (2013.01); *H04L 5/0048* (2013.01); *H04W 16/14* (2013.01); *H04W 16/28* (2013.01)

(58) Field of Classification Search
CPC . H04W 74/0808; H04W 16/14; H04W 16/28; H04L 5/0048; H04L 5/0023; H04B 7/0689; H04B 7/0617
See application file for complete search history.

(56) References Cited

U.S. PATENT DOCUMENTS

2017/0238233 A1 8/2017 Oh et al.
2017/0245302 A1 8/2017 Mukherjee et al.
(Continued)

FOREIGN PATENT DOCUMENTS

JP 2019033374 A 2/2019
JP 2019511858 A 4/2019

OTHER PUBLICATIONS

"5G; NR; Physical channels and modulation (3GPP TS 38.211 version 15.7.0 Release 15)", ETSI TS 138 211 V15.7.0, Oct. 2019, 100 pages.
(Continued)

*Primary Examiner* — Eric Myers

(57) ABSTRACT

Methods and apparatuses for adapting a channel sensing threshold in a wireless communication system operating with shared spectrum channel access. A method for operating a base station (BS) includes determining whether an antenna configuration for channel sensing is omni-directional or directional and determining a channel sensing threshold. The channel sensing threshold includes two parts: a first part of the channel sensing threshold being common for omni-directional and directional antenna configurations and a second part of the channel sensing threshold depending on the antenna configuration. The method further includes performing a channel sensing procedure based on the antenna configuration and the channel sensing threshold
(Continued)

and transmitting downlink (DL) data over a channel based on the channel being sensed as idle in the channel sensing procedure.

16 Claims, 13 Drawing Sheets

Related U.S. Application Data continuation of application No. 17/248,613, filed on Jan. 29, 2021, now abandoned.

(60) Provisional application No. 62/976,461, filed on Feb. 14, 2020, provisional application No. 62/969,848, filed on Feb. 4, 2020.

(51) Int. Cl.
  H04W 16/14 (2009.01)
  H04W 16/28 (2009.01)

(56) References Cited

U.S. PATENT DOCUMENTS

| | | | |
|---|---|---|---|
| 2017/0303314 A1 | 10/2017 | Cariou et al. | |
| 2018/0115996 A1 | 4/2018 | Si et al. | |
| 2019/0053062 A1 | 2/2019 | Wang et al. | |
| 2019/0059104 A1 | 2/2019 | Gu et al. | |
| 2020/0382967 A1 | 12/2020 | Yamada et al. | |

OTHER PUBLICATIONS

"5G; NR; Multiplexing and channel coding (3GPP TS 38.212 version 15.7.0 Release 15)", ETSI TS 138 212 V15.7.0, Oct. 2019, 106 pages.
"5G; NR; Physical layer procedures for control (3GPP TS 38.213 version 15.7.0 Release 15)", ETSI TS 138 213 V15.7.0, Oct. 2019, 112 pages.
"5G; NR; Physical layer procedures for data (3GPP TS 38.214 version 15.7.0 Release 15)", ETSI TS 138 214 V15.7.0, Oct. 2019, 108 pages.
"5G; NR; Radio Resource Control (RRC); Protocol specification (3GPP TS 38.331 version 15.7.0 Release 15)", ETSI TS 138 331 V15.7.0, Oct. 2019, 523 pages.
International Search Report and Written Opinion of the International Searching Authority in connection with International Application No. PCT/KR2021/001461 issued May 20, 2021, 7 pages.
Samsung, "Remaining Issues for NR-U", 3GPP TSG RAN WG1 #98bis, R1-1910464, Chongqing, China, Oct. 14-20, 2019, 8 pages.
Extended European Search Report issued Jun. 20, 2024 regarding Application No. 21751335.7, 14 pages.
Chinese National Intellectual Property Administration, Office Action issued Sep. 10, 2024 regarding Application No. 202180012798.X, 11 pages.
Japanese Patent Office, Notice of Reasons for Refusal issued Nov. 27, 2024 regarding Application No. 2022-547755, 6 pages.

METHOD AND APPARATUS FOR ADAPTING A CHANNEL SENSING THRESHOLD

CROSS-REFERENCE TO RELATED APPLICATIONS AND CLAIM OF PRIORITY

This application is a continuation of U.S. patent application Ser. No. 17/929,658, filed on Sep. 2, 2022, which is a continuation of U.S. patent application Ser. No. 17/248,613, filed on Jan. 29, 2021, which claims priority to U.S. Provisional Patent Application No. 62/969,848, filed on Feb. 4, 2020 and U.S. Provisional Patent Application No. 62/976,461, filed on Feb. 14, 2020. The contents of the above-identified patent documents are incorporated herein by reference.

TECHNICAL FIELD

The present disclosure relates generally to wireless communication systems and, more specifically, the present disclosure relates to adapting a channel sensing threshold in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to adapting a channel sensing threshold in a wireless communication system.

In one embodiment, a base station (BS) in a wireless communication system operating with shared spectrum channel access is provided. The BS includes a processor configured to determine whether an antenna configuration for channel sensing is omni-directional or directional and determine a channel sensing threshold. The channel sensing threshold includes two parts: a first part of the channel sensing threshold being common for omni-directional and directional antenna configurations and a second part of the channel sensing threshold depending on the antenna configuration. The processor is further configured to perform a channel sensing procedure based on the antenna configuration and the channel sensing threshold. The BS also includes a transceiver operably connected to the processor. The transceiver is configured to transmit downlink (DL) data over a channel, if the channel is sensed as idle in the channel sensing procedure.

In another embodiment, a method of a BS in a wireless communication system operating with shared spectrum channel access is provided. The method includes determining whether an antenna configuration for channel sensing is omni-directional or directional and determining a channel sensing threshold. The channel sensing threshold includes two parts: a first part of the channel sensing threshold being common for omni-directional and directional antenna configurations and a second part of the channel sensing threshold depending on the antenna configuration. The method further includes performing a channel sensing procedure based on the antenna configuration and the channel sensing threshold and transmitting DL data over a channel based on the channel being sensed as idle in the channel sensing procedure.

In yet another embodiment, a user equipment (UE) in a wireless communication system operating with shared spectrum channel access is provided. The UE includes a processor configured to determine whether a channel sensing threshold is configured, determine whether an antenna configuration for channel sensing is omni-directional or directional, and determine a default channel sensing threshold, if the channel sensing threshold is not configured. The default channel sensing threshold includes two parts: a first part of the default channel sensing threshold being common for omni-directional and directional antenna configurations and a second part of the default channel sensing threshold depending on the antenna configuration. The processor is further configured to perform a channel sensing procedure based on the antenna configuration and the default channel sensing threshold. The UE further includes a transceiver operably connected to the processor. The transceiver is configured to transmit DL data over a channel, if the channel is sensed as idle in the channel sensing procedure.

In yet another embodiment, a method of a UE in a wireless communication system operating with shared spectrum channel access is provided. The method includes determining whether a channel sensing threshold is configured, determining whether an antenna configuration for channel sensing is omni-directional or directional, and determining a default channel sensing threshold based on determining that the channel sensing threshold is not configured. The default channel sensing threshold includes two parts: a first part of the default channel sensing threshold being common for omni-directional and directional antenna configurations and a second part of the default channel sensing threshold depending on the antenna configuration. The method further includes performing a channel sensing procedure based on the antenna configuration and the default channel sensing threshold and transmitting DL data over a channel based on the channel being sensed as idle in the channel sensing procedure.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.7.0, "NR; Physical channels and modulation"; 3GPP TS 38.212 v15.7.0, "NR; Multiplexing and Channel coding"; 3GPP TS 38.213 v15.7.0, "NR; Physical Layer Procedures for Control"; 3GPP TS 38.214 v15.7.0, "NR; Physical Layer Procedures for Data"; and 3GPP TS 38.331 v15.7.0, "NR; Radio Resource Control (RRC) Protocol Specification."

Figure 1:
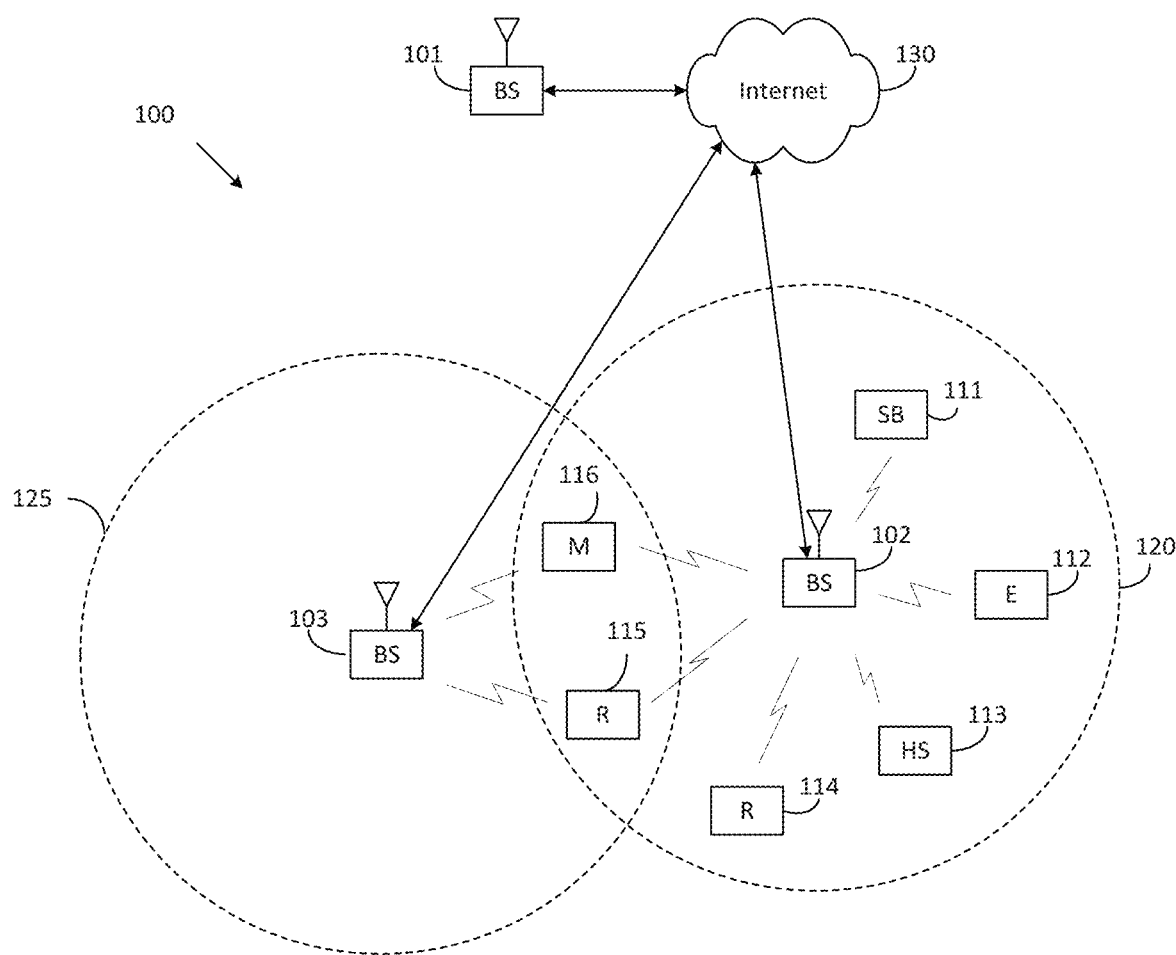
FIG. 1 illustrates an example wireless network according to embodiments of the present disclosure.
Figure 2:
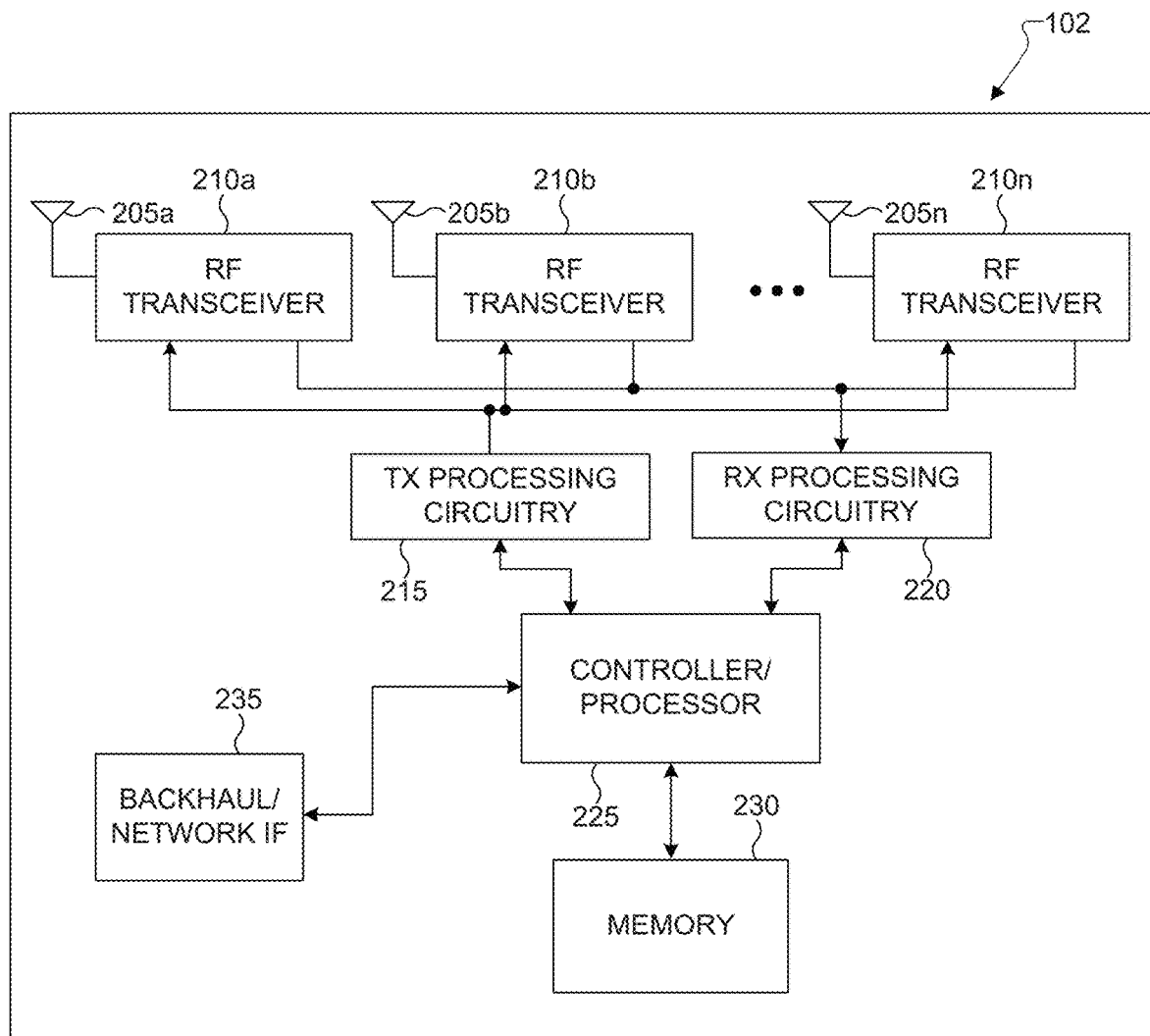
FIG. 2 illustrates an example gNB according to embodiments of the present disclosure.
Figure 3:
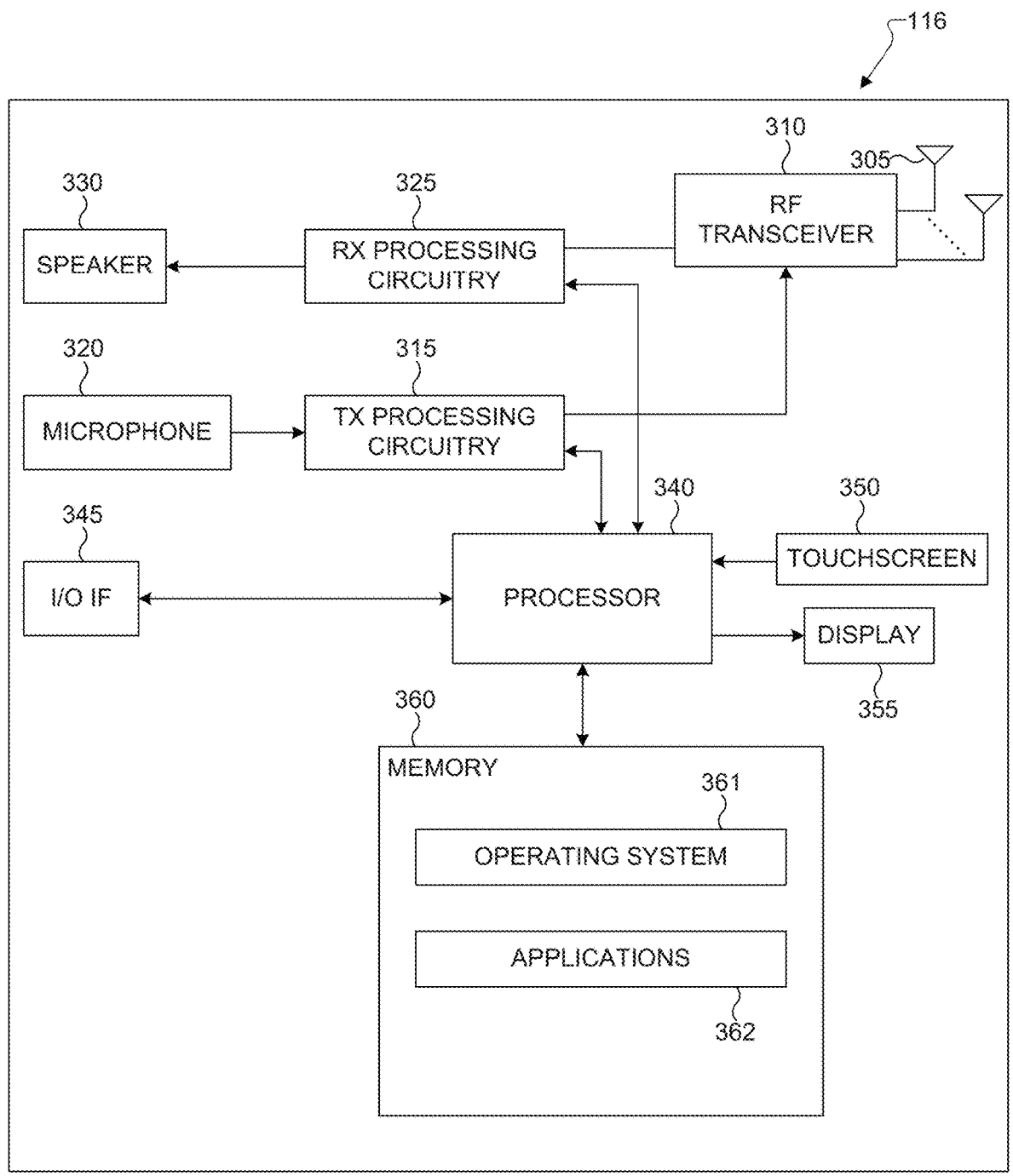
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for beam management and coverage enhancements for adapting a channel sensing threshold. In certain embodiments, and one or more of the gNBs 101-103 includes circuitry, programing, or a combination thereof, for adapting a channel sensing threshold.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. The present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
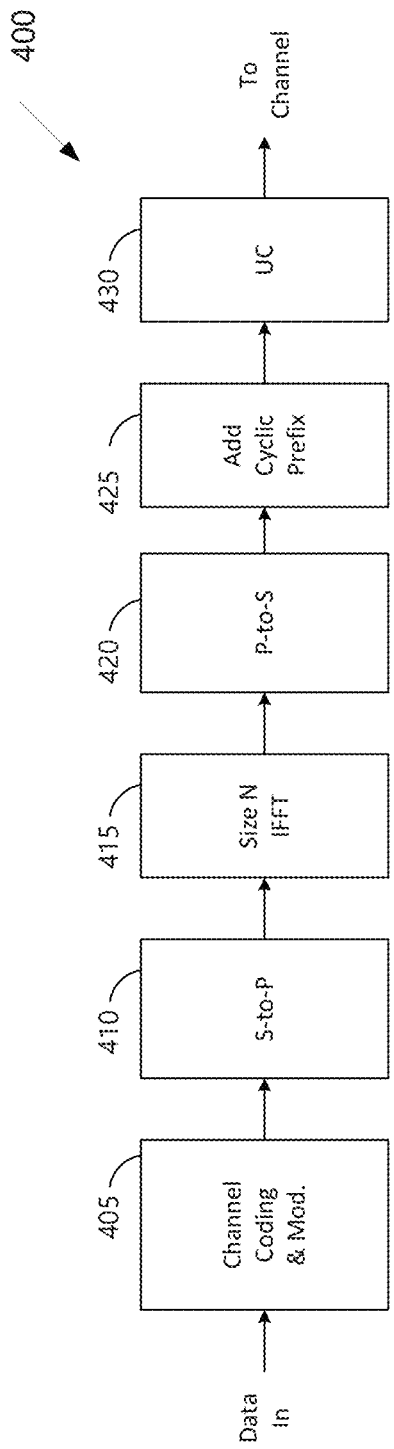
FIGS. 4 and 5 illustrate example wireless transmit and receive paths according to this disclosure.
Figure 5:
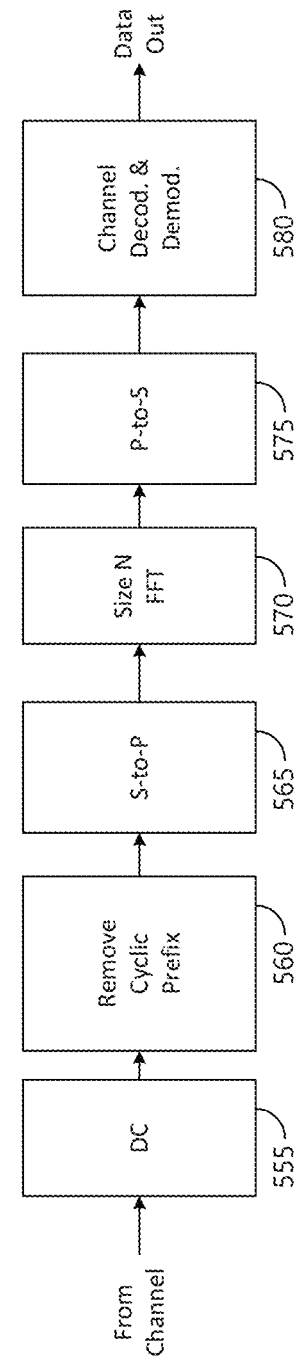

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support adapting a channel sensing threshold as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

This disclosure focuses on adaptation of channel sensing threshold based on the antenna configuration for sensing the channel. The channel sensing threshold can be associated with the intended transmission direction and be indicated to the UE by a higher layer parameter or a PHY layer parameter. More precisely, the following components are provided in this disclosure: a directional channel sensing threshold; channel sensing threshold association; a channel sensing threshold determination; and/or a UE procedure for a utilizing channel sensing threshold.

For operation with a shared spectrum channel access (e.g., unlicensed or shared spectrum), a transmitter may perform sensing that evaluates the availability of a channel for performing transmissions. For energy detection based sensing, a basic unit for sensing is defined as a sensing slot. A channel with a duration of s sensing slot is declared as idle, if the transmitter senses the channel during the sensing slot duration and determines that the detected power for a given portion of the sensing slot duration is less than a sensing threshold $X_{Thresh}$, or declared as busy otherwise.

In NR Rel-16, an operation with shared spectrum channel access has been supported for 5 GHz unlicensed band and 6 GHz unlicensed band. More precisely, for 5 GHz unlicensed band and 6 GHz unlicensed band, the sensing slot is defined as $T_{sl}$=9 us , and the sensing threshold can be adapted according to a maximum energy detection threshold.

In a DL, a gNB accessing a channel on which transmission(s) are performed, may set the energy detection threshold ($X_{Thresh}$) to be less than or equal to the maximum energy detection threshold $X_{Thresh\_max}$, wherein $X_{Thresh\_max}$ is determined as shown in TABLE 1.

TABLE 1

Energy detection threshold determination

- If the absence of any other technology sharing the channel can be guaranteed on a long-term basis (e.g., by level of regulation) then:

$$X_{Thresh\_max} = \min\left\{ \begin{array}{c} T_{max} + 10dB, \\ X_r \end{array} \right\}$$

- $X_r$ is Maximum energy detection threshold defined by regulatory requirements in dBm when such requirements are defined, otherwise $X_r = T_{max} + 10dB$
- Otherwise, $$X_{Thresh\_max} = \max\left\{ -72 + 10 \cdot \log 10(BWMHz/20MHz)\,dBm, \right.$$
$$\left. \min\left\{ \begin{array}{c} T_{max}, \\ T_{max} - T_A + (P_H + 10 \cdot \log 10(BWMHz/20MHz) - P_{TX}) \end{array} \right\} \right\}$$

- Where:
  - $T_A$ = 10 dB for transmission(s) including PDSCH;
  - $T_A$ = 5 dB for transmissions including discovery burst(s);
  - $P_H$ = 23 dBm;
  - $P_{TX}$ is the set maximum eNB/gNB output power in dBm for the channel;
    - eNB/gNB uses the set maximum transmission power over a single channel irrespective of whether single channel or multi-channel transmission is employed
  - $T_{max}$(dBm) = 10 · log 10 (3.16228 · $10^{-8}$(mW/MHz) · BWMHz (MHz));
  - BWMHz is the single channel bandwidth in MHz.

In an UL, a UE accessing a channel on which UL transmission(s) are performed, may set the energy detection threshold ($X_{Thresh}$) to be less than or equal to the maximum energy detection threshold $X_{Thresh\_max}$, wherein $X_{Thresh\_max}$ is determined as shown in TABLE 2.

TABLE 2

Energy detection threshold determination

- If the UE is configured with higher layer parameter maxEnergyDetectionThreshold-r14 or maxEnergyDetectionThreshold-r16,
  - $X_{Thresh\_max}$ is set equal to the value signaled by the higher layer parameter.
- otherwise
  - the UE may determine $X'_{Thresh\_max}$ as follow.
  - if the UE is configured with higher layer parameter energyDetectionThresholdOffset-r14 or energyDetectionThresholdOffset-r16
    - $X_{Thresh\_max}$ is set by adjusting $X'_{Thresh\_max}$ according to the offset value signaled by the higher layer parameter
  - otherwise
    - The UE may set $X_{Thresh\_max} = X'_{Thresh\_max}$ If the higher layer parameter absenceOfAnyOtherTechnology-r16 is not configured to a UE, and the higher layer parameter ULtoDL-CO-SharingED-Threshold-r16 is configured to the UE, the gNB may use the gNB's transmit power in determining the resulting energy detection threshold ULtoDL-CO-SharingED-Threshold-r16.

For the case where a UE performs channel access procedures and shares the corresponding channel occupancy time with the gNB, $X_{Thresh\_max}$ is set equal to the value provided by the higher layer parameter ULtoDL-CO-SharingED-Threshold-r16, if provided.

If the higher layer parameter absenceOfAnyOtherTechnology-r14 or absenceOfAnyOtherTechnology-r16, parameters are provided as shown in TABLE 3.

TABLE 3

Parameters $$X'_{Thresh\_max} = \min\left\{ \begin{array}{c} T_{max} + 10dB \\ X_r \end{array} \right\} \text{ where}$$

- $X_r$ is Maximum energy detection threshold defined by regulatory requirements in dBm when such requirements are defined, otherwise
  $X_r = T_{max} + 10dB$
  otherwise $$X'_{Thresh\_max} = \max\left\{ -72 + 10 \cdot \log 10(BWMHz/20MHz)\,dBm, \right.$$
$$\left. \min\left\{ \begin{array}{c} T_{max}, \\ T_{max} - T_A + (P_H + 10 \cdot \log 10(BWMHz/20MHz) - P_{TX}) \end{array} \right\} \right\}$$

TABLE 3-continued

Parameters

Where
- $T_A$ = 10dB
- $P_H$ = 23dBm;
- $P_{TX}$ is the set to the value of $P_{CMAX\_H,c}$.
- $T_{max}$(dBm) = 10 · log 10 (3.16228 · $10^{-8}$(mW/MHz) · BWMHz (MHz))
;
- BWMHz is the single channel bandwidth in MHz.

For higher carrier frequency range, for example 60 GHz unlicensed spectrum, transmissions may utilize highly-directional beamforming. To support this, the corresponding channel sensing could also be configured to be highly-directional, in order to save sensing energy on directions not related to the intended transmission, wherein the new type of sensing is referred to as directional channel sensing, to be distinguished from classical omni-directional channel sensing. This disclosure specifies the adaptation on the channel sensing threshold.

Although exemplary descriptions and embodiments to follow assume OFDM or OFDMA, this disclosure can be extended to OFDM-based transmission waveforms or multiple access schemes such as filtered OFDM (F-OFDM).

This disclosure covers several components which can be used in conjunction or in combination with one another or can operate as standalone schemes.

In one embodiment, a channel sensing threshold can be adapted based on the antenna configuration for channel sensing.

In one example, whether the channel sensing threshold is adapted based on the antenna configuration for channel sensing can be indicated in the system information.

In one example, whether the channel sensing threshold is adapted based on the antenna configuration for channel sensing can be configured by a RRC parameter.

In one example, there can be a channel sensing threshold offset applied to a common channel sensing threshold regardless of the antenna configuration (e.g. the maximum channel sensing threshold $X_{Thresh\_max}$), wherein the channel sensing threshold offset can be denoted as $X_{Thresh\_offset}$, and the channel sensing threshold offset is based on the antenna configuration for channel sensing.

Figure 6:
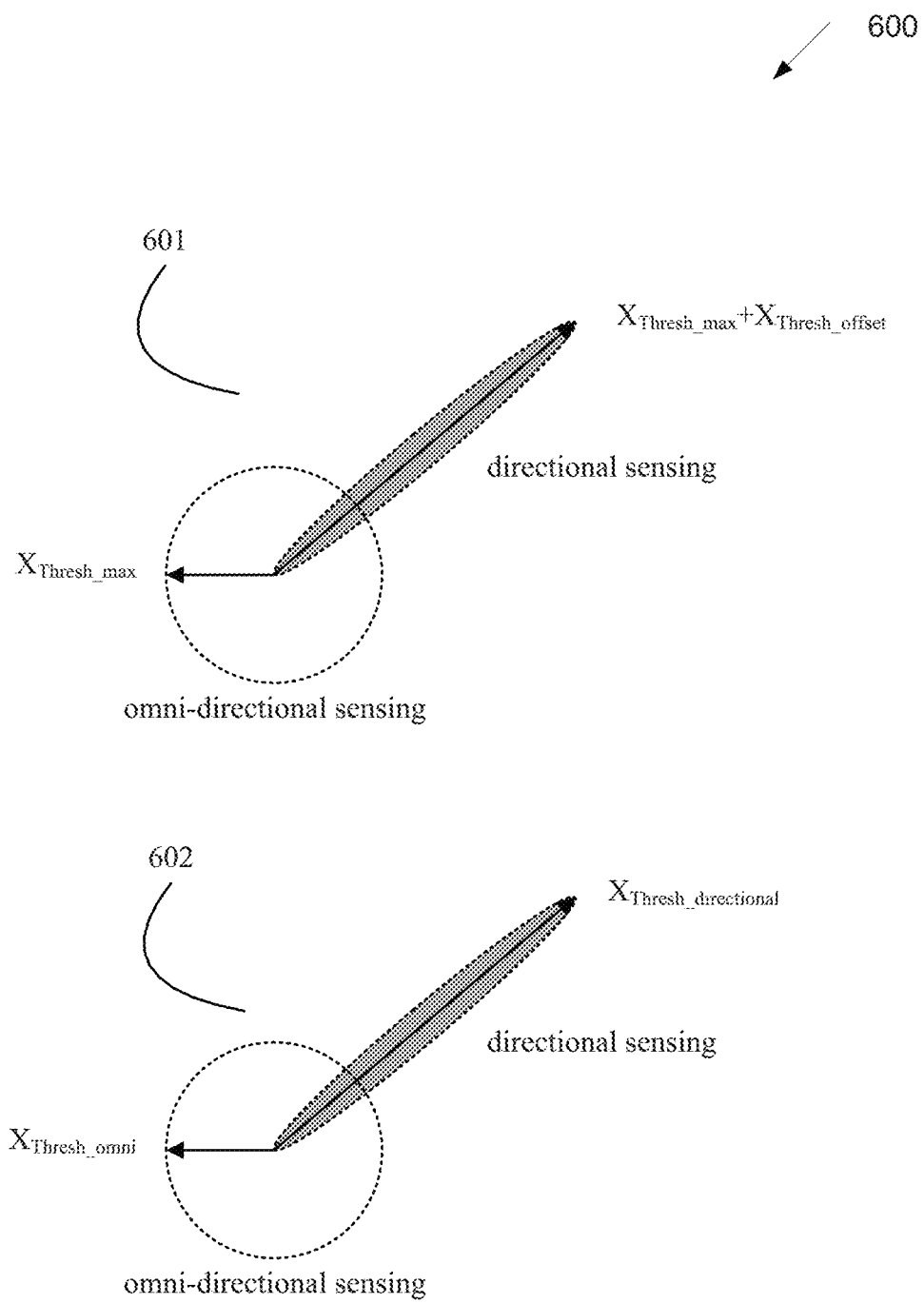
FIG. 6 illustrate an example adaptation of channel sensing threshold based on antenna configuration for channel sensing according to embodiments of the present disclosure.

FIG. 6 illustrate an example adaptation of channel sensing threshold 600 based on antenna configuration for channel sensing according to embodiments of the present disclosure. An embodiment of the adaptation of channel sensing threshold 600 shown in FIG. 6 is for illustration only.

In one example, the channel sensing threshold offset can be applicable to directional channel sensing, wherein the antenna configuration for channel sensing is directional, e.g. $X_{Thresh\_offset}>0$, if the antenna configuration for channel sensing is directional.

In one example, the channel sensing threshold offset can be determined as $X_{Thresh\_offset}=0$, if the antenna configuration for channel sensing is omni-directional.

In one example, whether the channel sensing threshold offset is applicable can be based on the configuration that whether the channel sensing threshold is adapted based on the antenna configuration for channel sensing.

In one example, the maximum channel sensing threshold $X_{Thresh\_max}$ can be based on the antenna configuration for channel sensing. These examples are illustrated in 601 and 602 of FIG. 6.

In one example, the channel sensing threshold can be different for the antenna configuration for channel sensing being directional or omni-directional.

In one example, if the configuration indicates that the channel sensing threshold is adapted based on the antenna configuration for channel sensing, the channel sensing threshold can be different for the antenna configuration for channel sensing being directional or omni-directional; otherwise, the channel sensing threshold maintains the same.

In one example, the adaptation of the channel sensing threshold can be based on a number of antenna configurations (e.g., number of directions/beams). In this example, the channel sensing threshold for all the antenna configurations (e.g., directions/beams) are the same, e.g., a common $X_{Thresh\_max}$ or $X_{Thresh\_offset}$ based on the number of antenna configurations (e.g., number of directions/beams). For instance, $X_{Thresh\_offset}=f(N_{beam})$ or $X_{Thresh\_max}=f(N_{beam})$, where $N_{beam}$ is the number of antenna configurations (e.g., number of directions/beams).

In another example, the adaptation of the channel sensing threshold can be based on one or a group of antenna configurations. In this example, the channel sensing threshold can be direction-specific or group-of-direction-specific, e.g., $X_{Thresh\_max}$ or $X_{Thresh\_offset}$ is based on a direction or a group of directions. For instance, $X_{Thresh\_max}(i_{beam})=f(i_{beam})$, or $X_{Thresh\_offset}(i_{beam})=f(i_{beam})$, wherein $i_{beam}$ is the index of a direction or a group of directions.

In one embodiment, there is an association between the channel sensing threshold and an antenna configuration.

In one example, there can be an association between an antenna port and a channel sensing threshold. In one example, when transmitting signal(s) and/or channel(s) using the antenna port, the associated channel censing threshold may be utilized.

In one example, a gNB can configure a channel sensing threshold and/or a channel sensing threshold offset to be associated with an antenna port. In one example, the configuration can be indicated in the system information. In one example, the configuration can be indicated in a dedicated RRC parameter.

In one example, the association between an antenna port and a channel sensing threshold and/or a channel sensing threshold offset can be hard coded and fixed in the specification.

In one example, there can be an association between a reference signal and a channel sensing threshold.

In one example, at least signals in a synchronization signal/physical broadcasting channel (SS/PBCH) block can be the reference signal to be associated with a channel sensing threshold. In one example, a gNB can configure a channel sensing threshold and/or a channel sensing threshold offset to be associated with an index of SS/PBCH block. In one example, the association can be indicated in a RRC parameter. In another example, the association can be indicated in a DCI format. For one instance of this example, RRC parameter can configure a set of possible values for the channel sensing threshold and/or channel sensing threshold offset, and the DCI format indicates the association between the index of SS/PBCH block and the value of channel sensing threshold and/or channel sensing threshold offset.

In another example of a reference signal, at least a CSI-RS can be the reference signal to be associated with a channel sensing threshold. In one example, a gNB can configure a channel sensing threshold and/or a channel sensing threshold offset to be associated with an index of CSI-RS resource. In one example, the association can be indicated in a RRC parameter. In another example, the association can be indicated in a DCI format. For one instance of this example, RRC parameter can configure a set of possible values for the channel sensing threshold and/or channel sensing threshold offset, and the DCI format indicates the association between the index of CSI-RS resource and the value of channel sensing threshold and/or channel sensing threshold offset.

In yet another example of the reference signal, at least an SRS can be the reference signal to be associated with a channel sensing threshold. In one example, a gNB can configure a channel sensing threshold and/or a channel sensing threshold offset to be associated with an index of SRS resource.

In one example, there can be an association between a quasi co-location (QCL) assumption and a channel sensing threshold.

In one example, signals with the same QCL assumption can be associated with the same channel sensing threshold.

In one example, there can be an association between a transmission configuration indication state (TCI-state) and a channel sensing threshold.

For one example, a gNB can configure a channel sensing threshold and/or a channel sensing threshold offset to be associated with a TCI-state. In one example, the association can be indicated in a RRC parameter. In one example, the association can be indicated in a DCI format. For example, RRC parameter can configure a set of possible values for the channel sensing threshold and/or channel sensing threshold offset, and the DCI format indicates the association between the TCI-state and the value of channel sensing threshold and/or channel sensing threshold offset.

In one example, there can be an association between a spatial filter for physical uplink control channel (PUCCH) (e.g., PUCCH-SpatialRelationInfo) and a channel sensing threshold.

In one example, a gNB can configure a channel sensing threshold and/or a channel sensing threshold offset to be associated with a spatial filter for PUCCH (e.g., PUCCH-SpatialRelationInfo). In one instance, the association can be indicated in a RRC parameter.

In one example, there can be an association between an indication of a direction/beam or a group of directions/beams and a channel sensing threshold.

In one example, the indication of a direction/beam can be a bit in a bitmap, wherein the bitmap indicates all the directions/beams for transmission or channel sensing. In one sub-example, the bitmap can be a bitmap for a burst of SS/PBCH blocks within a period.

In one embodiment, a transmission burst can include signal(s) and/or channel(s) being associated with at least one channel sensing threshold, wherein the association can be according to examples in this disclosure.

In one example, if signal(s) and/or channel(s) in a transmission burst are associated with only one channel sensing threshold, then the transmitter (e.g., a gNB or a UE) may perform channel sensing according to the associated channel sensing threshold.

In one example, signal(s) and/or channel(s) in one transmission burst can be associated with a plurality of channel sensing thresholds. An illustration of this example is shown in FIG. 7, wherein a first part of the transmission burst is associated with a first channel sensing threshold, and a second part of the transmission burst is associated with a second part of sensing threshold.

Figure 7:
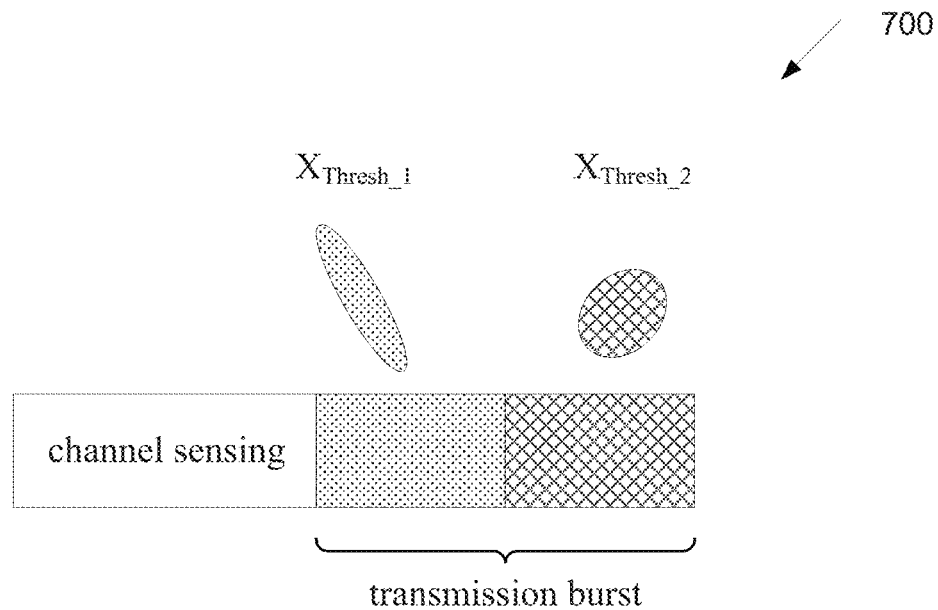
FIG. 7 illustrates an example one transmission burst associated with a plurality of channel sensing thresholds according to embodiments of the present disclosure.

FIG. 7 illustrates an example one transmission burst associated with a plurality of channel sensing thresholds 700 according to embodiments of the present disclosure. An embodiment of the one transmission burst associated with a plurality of channel sensing thresholds 700 shown in FIG. 7 is for illustration only.

In one example, the channel sensing threshold applied to initialize the transmission burst may be no larger than the minimum of all the associated channel sensing thresholds.

In one example, the channel sensing threshold applied to initialize the transmission burst may be no larger than the maximum of all the associated channel sensing thresholds.

In one example, the channel sensing threshold applied to initialize the transmission burst may be no larger than the average of all the associated channel sensing thresholds.

In one embodiment, a UE can be configured a channel sensing threshold or a channel sensing threshold offset, wherein the channel sensing threshold or the channel sensing threshold offset can be adapted based on antenna configuration for a UE's transmission.

In one embodiment, if the UE is not provided a channel sensing threshold or a channel sensing threshold offset by the higher layer, the UE uses the default channel sensing threshold to perform channel sensing, wherein the default channel sensing threshold does not include the impact from directional antenna configuration for the UE's transmission (e.g., assuming omni-directional antenna configuration).

In another embodiment, if the UE is provided a channel sensing threshold or a channel sensing threshold offset by the higher layer, but the provided channel sensing threshold or channel sensing threshold offset is not associated with the directional antenna configuration for the UE's transmission, the UE uses the default channel sensing threshold to perform channel sensing, wherein the default channel sensing threshold does not include the impact from directional antenna configuration for the UE's transmission (e.g., assuming omni-directional antenna configuration).

In yet another embodiment, if the UE is provided a channel sensing threshold, wherein the channel sensing threshold is associated with the directional antenna configuration for the UE's transmission, the UE uses the provided channel sensing threshold to perform channel sensing.

In yet another embodiment, if the UE is provided a channel sensing threshold offset, wherein the channel sensing threshold offset is associated with the directional antenna configuration for the UE's transmission, the UE applies the provided channel sensing threshold offset to the default channel sensing threshold and to calculate a new channel sensing threshold and uses the new channel sensing threshold to perform channel sensing.

Figure 8A:
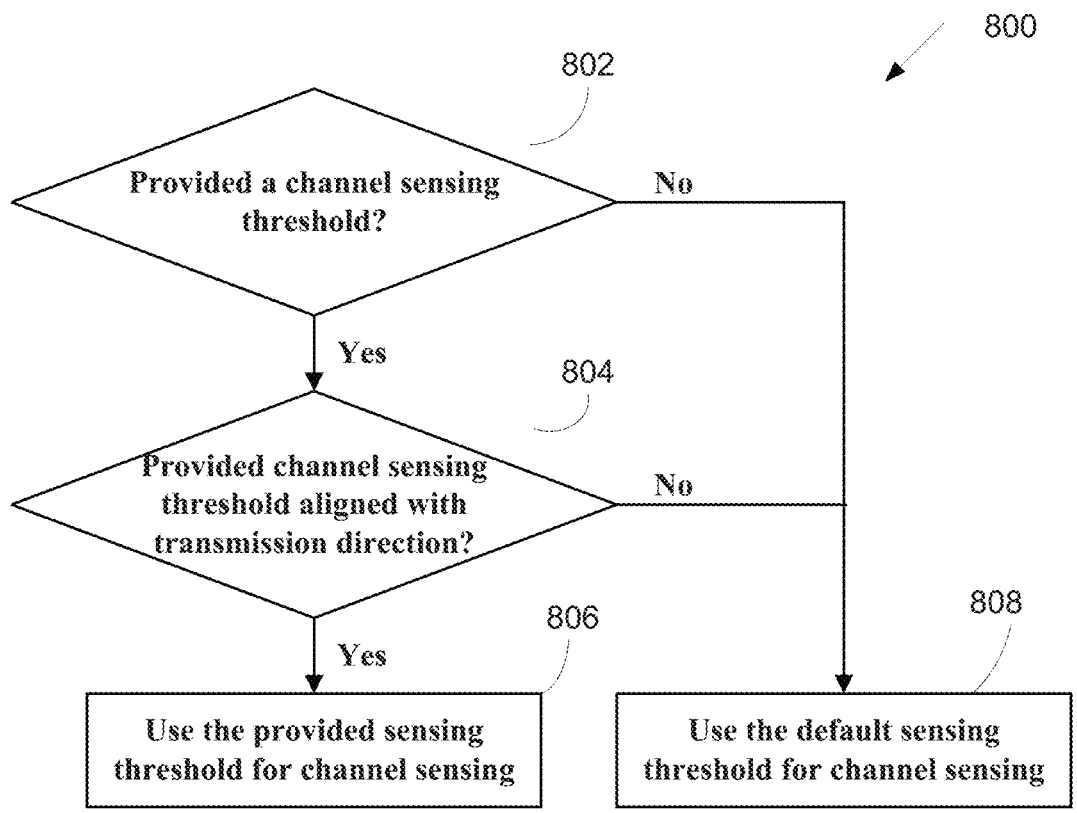
FIGS. 8A, 8B, and 8C illustrates a flowchart of a method of a UE for adapting channel sensing threshold according to embodiments of the present disclosure.

FIG. 8A illustrates a flowchart of a method 800 of a UE for adapting channel sensing threshold according to embodiments of the present disclosure as may be performed by a UE, such as UE 116 in FIG. 1. An embodiment of the method 800 shown in FIG. 8A is for illustration only. An embodiment of the method 800 shown in FIG. 8A is for illustration only. One or more of the components illustrated in FIG. 8A can be implemented in specialized circuitry configured to perform the noted functions or one or more of the components can be implemented by one or more processors executing instructions to perform the noted functions.

Figure 8B:
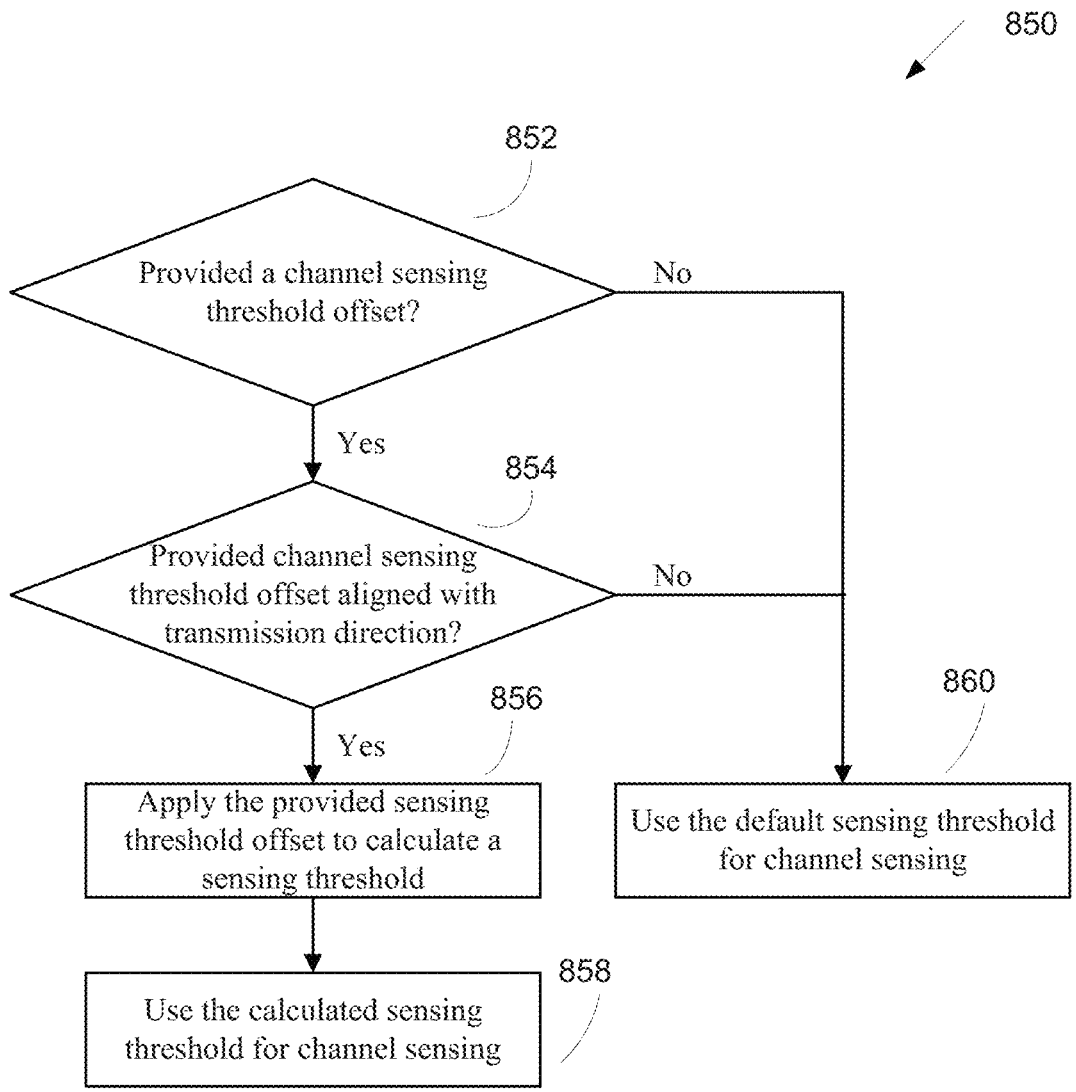
Figure 8C:
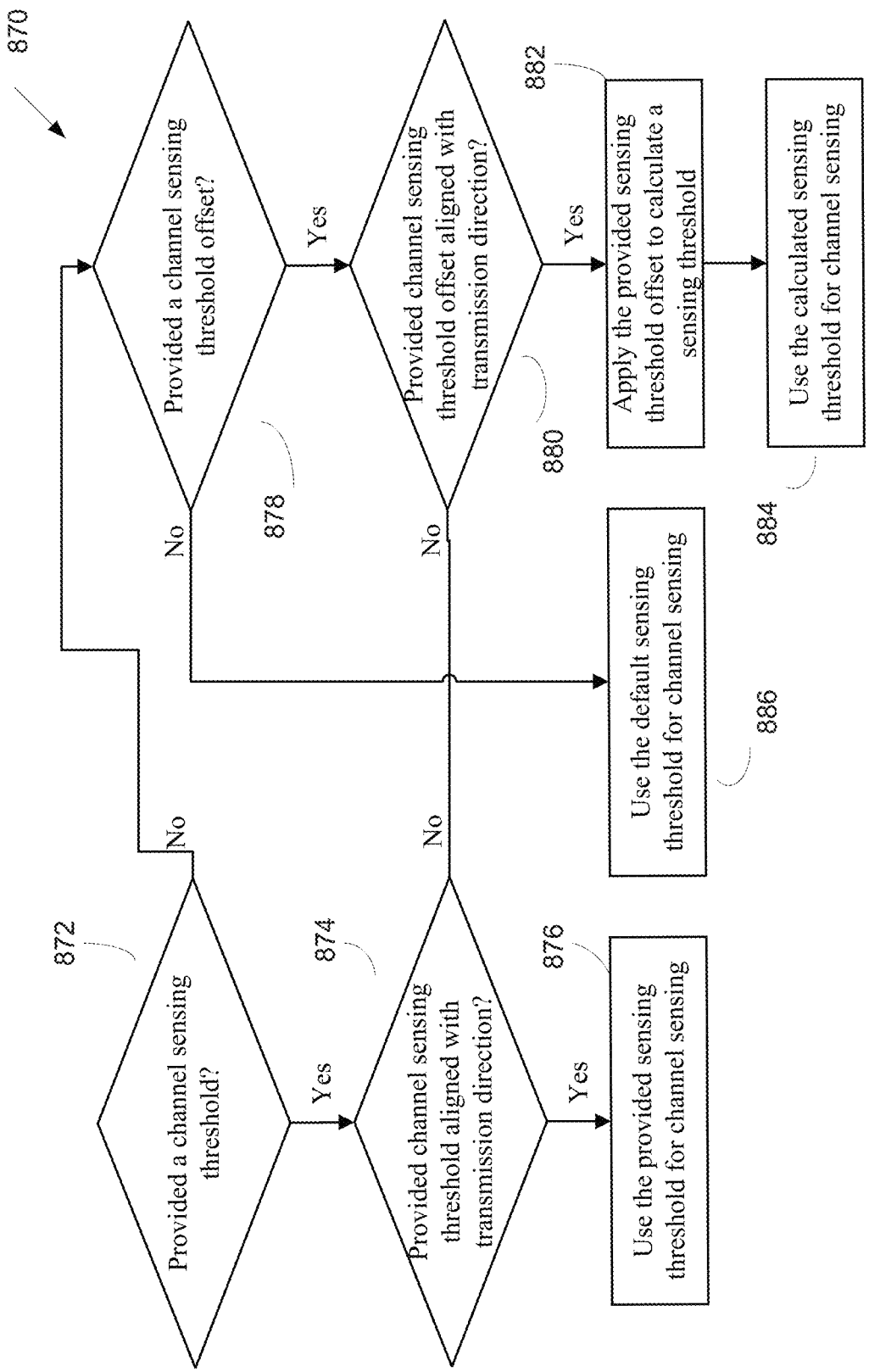

FIG. 8B illustrates another flowchart of a method 850 of a UE for adapting channel sensing threshold according to embodiments of the present disclosure as may be performed by a UE, such as UE 116 in FIG. 1. An embodiment of the method 850 shown in FIG. 8B is for illustration only. An embodiment of the method 850 shown in FIG. 8B is for illustration only. One or more of the components illustrated in FIG. 8B can be implemented in specialized circuitry FIG. 8C illustrates yet another flowchart of a method 870 of a UE for adapting channel sensing threshold according to embodiments of the present disclosure as may be performed by a UE, such as UE 116 in FIG. 1. An embodiment of the method 870 shown in FIG. 8C is for illustration only. An embodiment of the method 870 shown in FIG. 8C is for illustration only. One or more of the components illustrated in FIG. 8C can be implemented in specialized circuitry configured to perform the noted functions or one or more of the components can be implemented by one or more processors executing instructions to perform the noted functions.

Example UE procedures for an adapting channel sensing threshold are shown in FIGS. 8A, 8B, and 8C.

This disclosure focuses on the channel access procedure using directional channel sensing, wherein a case of channel access procedure can be applicable based on the composition of the transmission burst. Examples/embodiments to deal with the potential discontinuity of transmission burst are also covered by this disclosure. More precisely, the following components are included in this disclosure: channel access procedure based on directional sensing; channel access procedure based on composition of transmission burst; transmission discontinuity in a Case-3B channel access procedure; and/or transmission discontinuity in a Case-4B channel access procedure.

In NR Rel-16, an operation with shared spectrum channel access has been supported for 5 GHz unlicensed band and 6 GHz unlicensed band. More precisely, two types of channel access procedures are supported, wherein Type 1 channel access procedure includes a random time duration of channel sensing before a downlink transmission, and Type 2 channel access procedure includes a deterministic time duration (e.g., including zero duration) of channel sensing before a downlink transmission.

In one embodiment, at least one of the following cases of channel access procedures can be supported for transmitting a transmission burst with at least one transmission directions.

In one example of Case-1, the antenna for channel sensing before a transmission burst can be configured to be omni-directional or quasi-omni-directional, and one transmission burst follows a channel sensing duration using the omni-directional or quasi-omni-directional antenna.

In one example, the channel sensing duration can be either random (Type 1 channel sensing procedure) or deterministic (Type 2 channel sensing procedure). Note that Type 2 channel sensing procedure includes a zero sensing duration procedure, which implies transmission can start without channel sensing. In another example, the transmission direction for a transport block included in the transmission burst can be any direction, and there can be one or multiple transmission directions associated with transport block(s) included in the transmission burst, as shown in 901 or 902 of FIG. 9, respectively.

Figure 9:
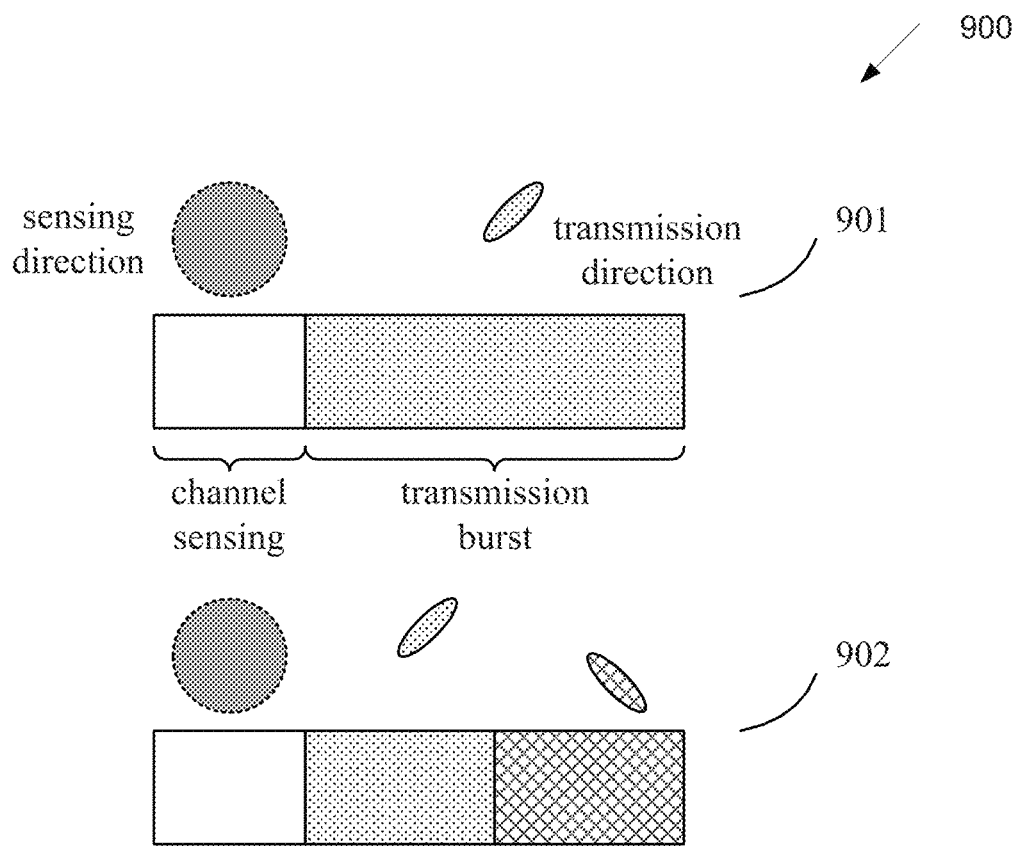
FIG. 9 illustrates an example channel access procedure according to embodiments of the present disclosure.

FIG. 9 illustrates an example channel access procedure 900 according to embodiments of the present disclosure. An embodiment of the channel access procedure 900 shown in FIG. 9 is for illustration only.

In one example of Case-2, the antenna for channel sensing before a transmission burst can be configured to be directional for a certain direction, and one transmission burst follows a channel sensing duration using the directional antenna. In one example, the channel sensing duration can be either random (Type 1 channel sensing procedure) or deterministic (Type 2 channel sensing procedure). Note that Type 2 channel sensing procedure includes a zero sensing duration procedure, which implies transmission can start without channel sensing. In another example, the direction for channel sensing may be aligned with the direction for transmission. For example, the antenna filter configuration for channel sensing is identical to the antenna filter configuration for transmission. An illustration of this case is shown in FIG. 10.

Figure 10:
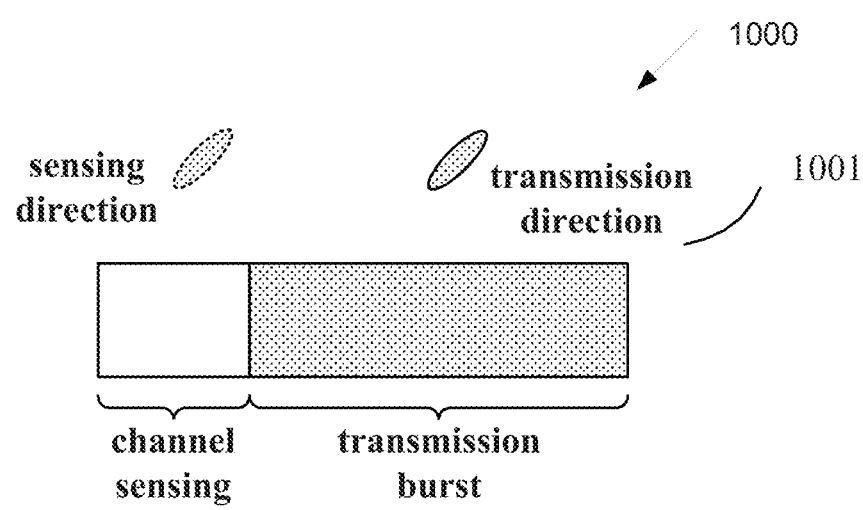
FIG. 10 illustrates another example channel access procedure according to embodiments of the present disclosure.

FIG. 10 illustrates another example channel access procedure 1000 according to embodiments of the present disclosure. An embodiment of the channel access procedure 1000 shown in FIG. 10 is for illustration only.

Figure 11:
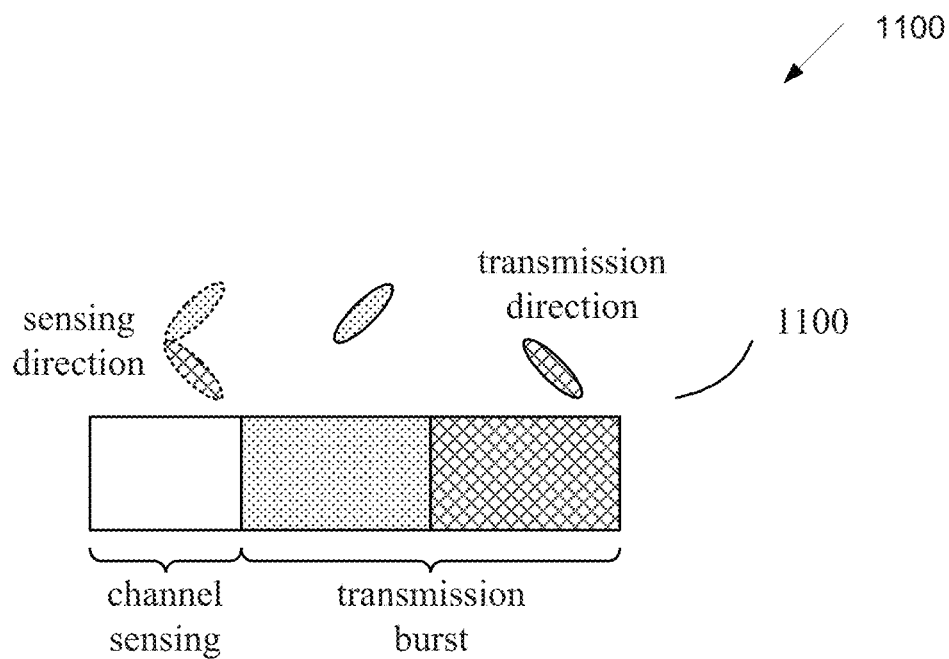
FIG. 11 illustrates yet another example channel access procedure according to embodiments of the present disclosure.

In one example of Case-3, the antenna for channel sensing before a transmission burst can be configured to be directional for a set of directions, and one transmission burst follows a channel sensing duration using the directional antenna for the set of directions. In one example, the channel sensing duration can be either random (Type 1 channel sensing procedure) or deterministic (Type 2 channel sensing procedure). Note that Type 2 channel sensing procedure refers to a zero sensing duration procedure, which implies transmission can start without channel sensing; or a positive value sensing duration procedure, which implies transmission can start after sensing a fixed time duration of the channel to be idle. In another example, the directions for channel sensing may be aligned with the directions for transmission. For example, the antenna filter configurations for channel sensing are identical to the antenna filter configurations for transmission. An illustration of this case is shown in FIG. 11. For another example, the antenna filter configurations for channel sensing are a super set of the antenna filter configurations for transmission.

FIG. 11 illustrates yet another example channel access procedure 1100 according to embodiments of the present disclosure. An embodiment of the channel access procedure 1100 shown in FIG. 11 is for illustration only.

In one example of Case-3A, the transmission burst can start regardless of the sensing result from channel sensing. An example with two directions is shown in TABLE 4.

In one example of Case-3B, the transmission burst can start but only according to the direction sensed as idle. An example with two directions is shown in TABLE 4.

In one example of Case-3C, the transmission burst cannot start if any of the sensing direction is busy, which is equivalent as all sensing directions are idle. An example with two directions is shown in TABLE 4.

TABLE 4

Channel access procedure for the third case.

| Sensing result | Case-3A | Case-3B | Case-3C |
| --- | --- | --- | --- |
| 1st direction idle, 2nd direction idle | Transmit on 1st and/or 2nd direction | Transmit on 1st and/or 2nd direction | Transmit on 1st and/or 2nd direction |
| 1st direction idle, 2nd direction busy | Transmit on 1st and/or 2nd direction | Transmit on 1st direction | Cannot transmit |
| 1st direction busy, 2nd direction idle | Transmit on 1st and/or 2nd direction | Transmit on 2nd direction | Cannot transmit |
| 1st direction busy, 2nd direction busy | Transmit on 1st and/or 2nd direction | Cannot transmit | Cannot transmit |

In one example of Case-4, the antenna for channel sensing before a transmission burst can be configured to be directional for a set of directions, and one transmission burst follows a channel sensing duration using the directional antenna for the set of directions. Meanwhile, within the transmission burst, before the transmission of a direction, another channel sensing with antenna configured for that direction is performed.

In one example, the channel sensing duration before the transmission burst can be random (Type 1 channel sensing procedure). In one example, the channel sensing duration within the transmission burst can be deterministic (Type 2 channel sensing procedure). Note that Type 2 channel sensing procedure includes a zero sensing duration procedure, which implies transmission within a transmission burst can start without channel sensing. In one example, the directions for channel sensing may be aligned with the directions for transmission. For example, the antenna filter configurations for channel sensing are identical to the antenna filter configurations for transmission. For yet another example, the first sensing duration within the transmission burst can be set as 0. An illustration of this case is shown in FIG. 11.

For this case, the sensing within transmission burst is performed only when the sensing before the transmission burst succeeds (e.g., channel is sensed as idle).

In one example of Case-4A, the transport block in the transmission burst can be transmitted regardless of result of associated directional channel sensing.

In one example of Case-4B, and the transport block in the transmission burst can be transmitted only when associated directional channel sensing succeeds (e.g., channel for that particular direction is sensed as idle).

Figure 12:
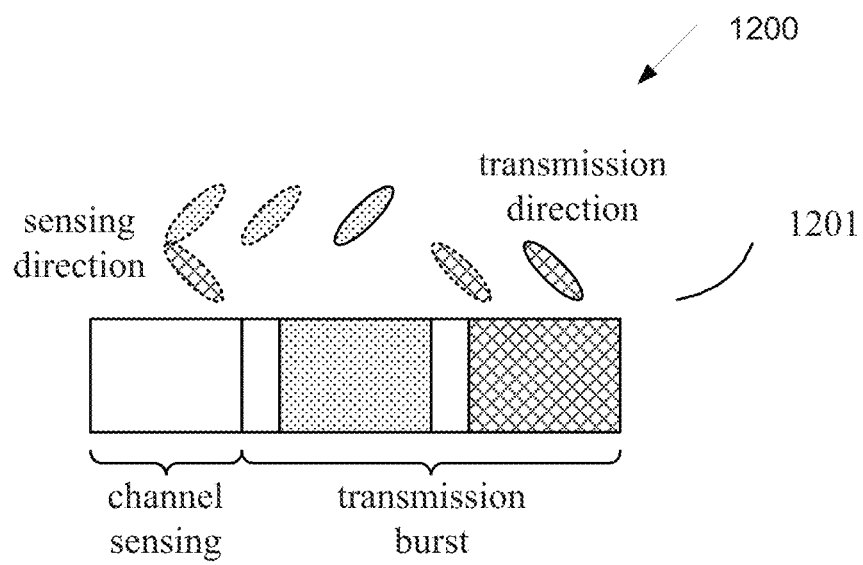
FIG. 12 illustrates yet another example channel access procedure according to embodiments of the present disclosure.

FIG. 12 illustrates yet another example channel access procedure 1200 according to embodiments of the present disclosure. An embodiment of the channel access procedure 1200 shown in FIG. 12 is for illustration only.

In one embodiment, a channel access procedure according to example case in this disclosure can be applicable to a transmission based on the composition of transmission burst. For one example, the applicable case(s) of channel access procedure depend on the type of signal(s) and/or channel(s) included in the transmission. For another example, the applicable case(s) of channel access procedure depend on the duration of signal(s) and/or channel(s) included in the transmission. For yet another example, the applicable case(s) of channel access procedure depend on the duty cycle of signal(s) and/or channel(s) included in the transmission.

In one example, when the transmission burst includes discovery burst only, the Case-3 channel access procedure can be applicable, wherein the discovery burst can include a burst of SS/PBCH blocks, and/or configured PDCCH and/or PDSCH of remaining minimum system information (RMSI) associated with the SS/PBCH blocks, and/or configured CSI-RS.

In one example, the Case-3A channel access procedure can be applicable, when the transmission burst includes discovery burst only. In this example, the discovery burst can be transmitted without channel sensing or regardless of the channel sensing result.

In one example, the Case-3C channel access procedure can be applicable, when the transmission burst includes discovery burst only. In this example, the transmission burst can be transmitted only when all the directions are sensed to be idle.

In one example, the Case-3B channel access procedure cannot be applicable, when the transmission burst includes discovery burst only. In this example, the transmission burst has to be transmitted as a whole.

In one example, when the transmission burst includes discovery burst only, the Case-4 channel access procedure can be applicable, wherein the discovery burst can include a burst of SS/PBCH blocks, and/or configured PDCCH and/or PDSCH of RMSI associated with the SS/PBCH blocks, and/or configured CSI-RS.

In one example, the Case-4A channel access procedure can be applicable, when the transmission burst includes discovery burst only. In this example, the discovery burst can be transmitted without channel sensing or regardless of the channel sensing result.

In one example, the Case-4B channel access procedure cannot be applicable, when the transmission burst includes discovery burst only. In this example, the transmission burst including discovery burst only has to be transmitted as a whole.

In one example, the channel access procedure for non-unicast DL signal(s) and/or channel(s) follows the channel access procedure for discovery burst, when the non-unicast signal(s) and/or channel(s) are multiplexed with the discovery burst as one whole transmission burst.

In one example, the Case-3 channel access procedure can be applicable, when the transmission burst includes non-unicast DL signal(s) and/or channel(s) only.

In one example, the Case-3C channel access procedure can be applicable, when the transmission burst includes non-unicast DL signal(s) and/or channel(s) only, and if the burst of non-unicast DL signal(s) and/or channel(s) has a QCL assumption association with a burst of SS/PBCH blocks. In this example, the transmission burst including non-unicast DL signal(s) and/or channel(s) only has to be transmitted as a whole.

In one example, the Case-3B channel access procedure can be applicable, when the transmission burst includes non-unicast DL signal(s) and/or channel(s) only, and if the burst of non-unicast DL signal(s) and/or channel(s) does not have a QCL assumption association with a burst of SS/PBCH blocks.

In one example, the Case-4 channel access procedure can be applicable, when the transmission burst includes non-unicast DL signal(s) and/or channel(s) only.

In one example, the Case-4B channel access procedure can be applicable, when the transmission burst includes non-unicast DL signal(s) and/or channel(s) only, and if the burst of non-unicast DL signal(s) and/or channel(s) does not have a QCL assumption association with a burst of SS/PBCH blocks.

In one example, the Case-3B channel access procedure can be applicable, when the transmission burst includes unicast DL signal(s) and/or channel(s).

In one example, the Case-4B channel access procedure can be applicable, when the transmission burst includes unicast DL signal(s) and/or channel(s).

In one example, the Case-3C channel access procedure can be applicable, when the transmission burst includes scheduled UL signal(s) and/or channel(s).

In one example, the Case-3B channel access procedure can be applicable, when the transmission burst includes non-scheduled UL signal(s) and/or channel(s).

In one example, the Case-4B channel access procedure can be applicable, when the transmission burst includes non-scheduled UL signal(s) and/or channel(s).

For transmission burst in Case-3B, if a directional sensing provides a sensing result as busy, the transmission segment included in the transmission burst cannot be transmitted.

Based on this channel access procedure, the transmission burst may not be continuous in time domain. An illustration of examples is shown in FIG. 13.

Figure 13:
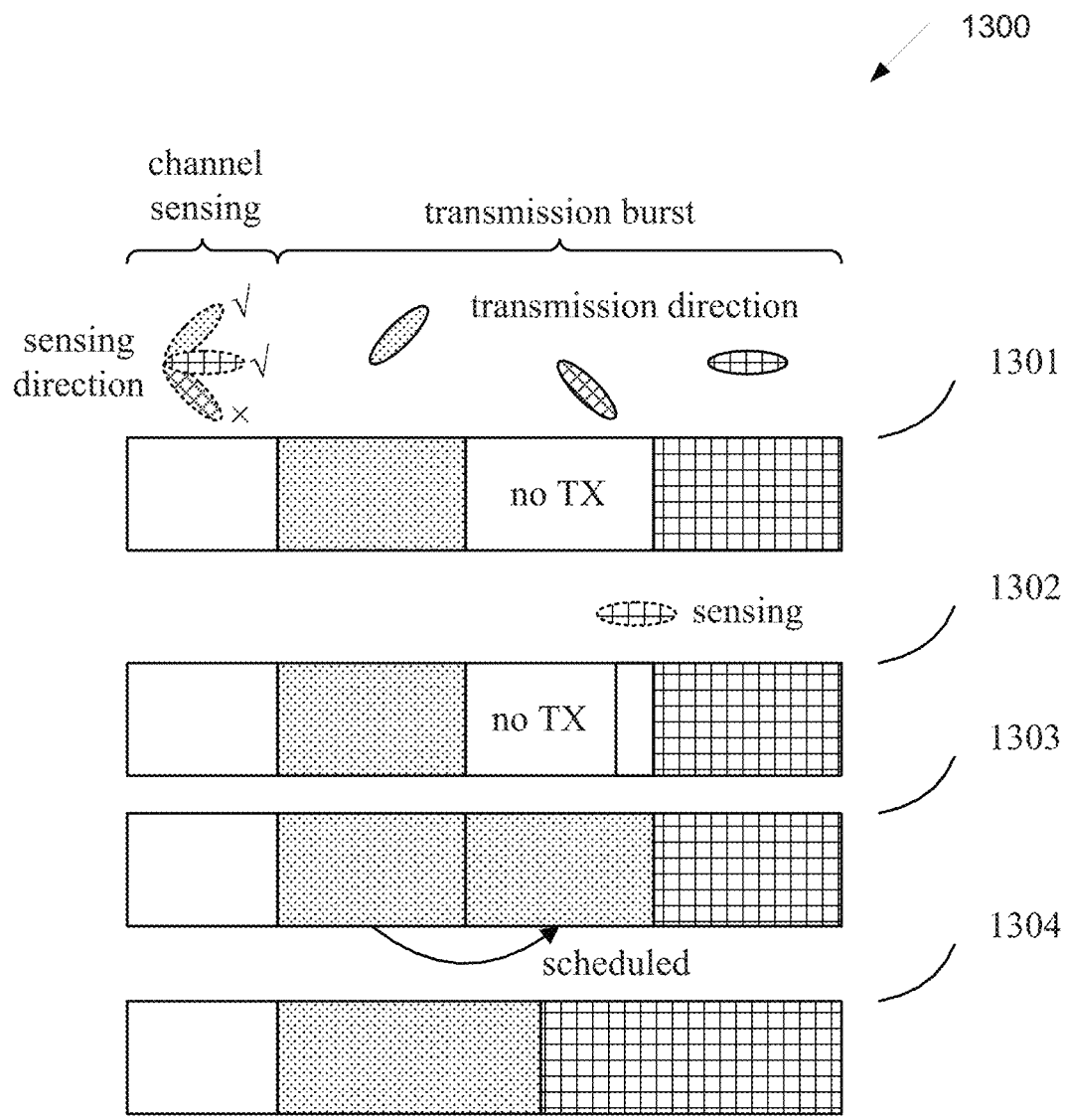
FIG. 13 illustrates an example discontinuity in a transmission burst for channel access procedure according to embodiments of the present disclosure.

FIG. 13 illustrates an example discontinuity in a transmission burst for channel access 1300 procedure according to embodiments of the present disclosure. An embodiment of the discontinuity in a transmission burst for channel access 1300 shown in FIG. 13 is for illustration only.

In one example, if one of the directional sensing is busy, the corresponding transmission segment cannot be transmitted, and the resources corresponding to the transmission segment can be left as empty. An example is shown in 1301 of FIG. 13.

In one example, the transmission burst is a downlink burst, and the segments in the downlink burst have predefined time domain occasions for transmission, such as at least one from SS/PBCH block, PDCCH and/or PDSCH of system information (e.g., system information block (SIBx)), or paging.

In one example, the transmission burst is an uplink burst, and the segments in the uplink burst have predefined time domain occasions for transmission, such as at least one from random access channel (RACH) preambles, or a scheduled uplink transmission burst.

In one example, if one of the directional sensing is busy, the corresponding transmission segment cannot be transmitted, and the resources corresponding to the transmission segment can be left as empty. If there are other transmission segments in the transmission burst, a directional channel sensing corresponding to the transmission direction of next transmission segment is required to be performed to resume transmission. In one example, the channel sensing duration of the directional channel sensing deterministic (Type 2 channel sensing procedure). An example is shown in 1302 of FIG. 13.

In one example, the transmission burst is a downlink burst, and the segments in the downlink burst have predefined time domain occasions for transmission, such as at least one from SS/PBCH block, PDCCH and/or PDSCH of system information (e.g., SIBx), or paging.

In one example, the transmission burst is an uplink burst, and the segments in the uplink burst have predefined time domain occasions for transmission, such as at least one from RACH preambles, or a scheduled uplink transmission burst.

In one example, if one of the directional sensing is busy, the corresponding transmission segment cannot be transmitted, and the resources corresponding to the transmission segment can be used for transmissions with direction sensed to be idle.

In one example, the scheduling of the resources corresponding to the cancelled transmission segment can be included in a previous transmitted segment, such as a PDCCH and/or PDSCH in the transmission segment. An illustration of this example is shown in 1303 of FIG. 13.

In one example, the resources corresponding to the cancelled transmission segment can be used for transmission according to the successful directions, and the scheduling information (e.g., included in DCI format carried by PDCCH) can be known to the receiver. An illustration of this example is shown in 1304 of FIG. 13.

For transmission burst in Case-4B, if a directional sensing provides a sensing result as busy, the transmission segment included in the transmission burst cannot be transmitted. Based on this channel access procedure, the transmission burst may not be continuous in time domain. An illustration of examples is shown in FIG. 14.

Figure 14:
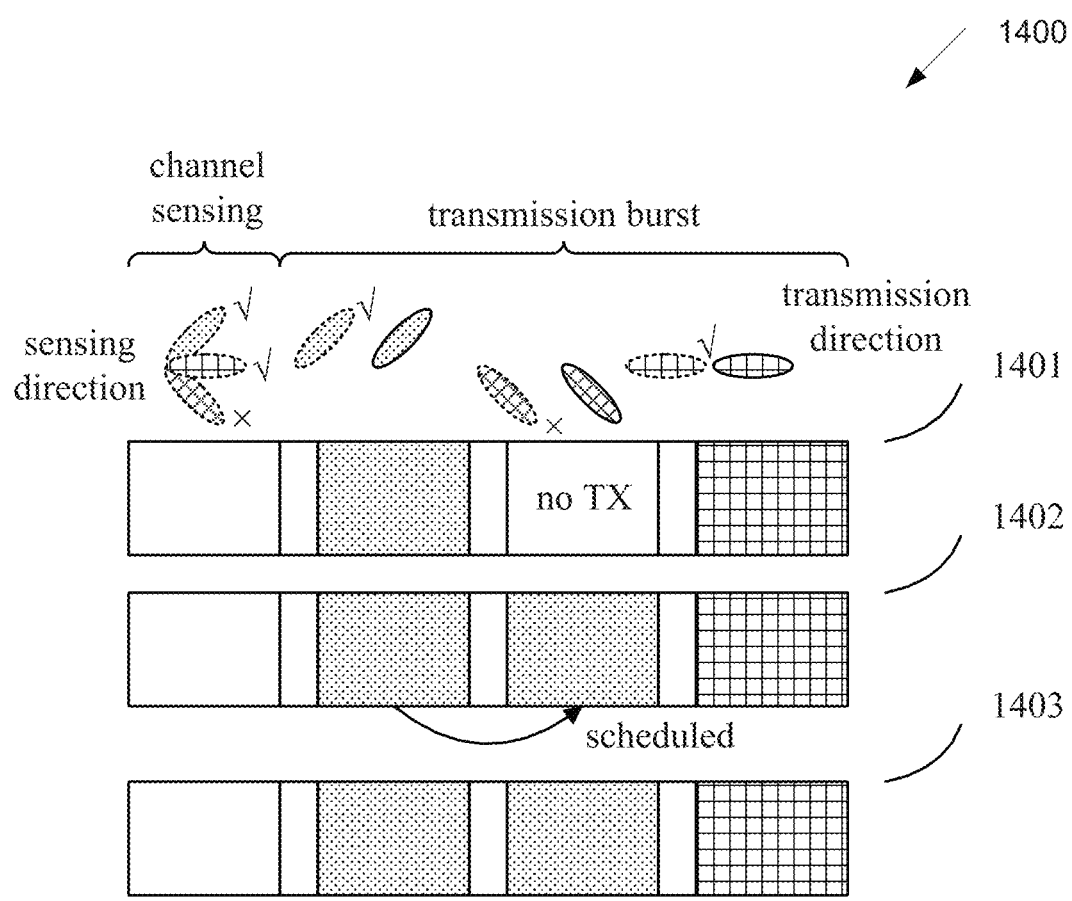
FIG. 14 illustrates another example discontinuity in a transmission burst for channel access procedure according to embodiments of the present disclosure.

FIG. 14 illustrates another example discontinuity in a transmission burst for channel access procedure 1400 according to embodiments of the present disclosure. An embodiment of the discontinuity in a transmission burst for channel access procedure 1400 shown in FIG. 14 is for illustration only.

In one example, if one of the directional sensing is busy, the corresponding transmission segment cannot be transmitted, and the resources corresponding to the transmission segment can be left as empty. An example is shown in 1401 of FIG. 14.

In one example, the transmission burst is a downlink burst, and the segments in the downlink burst have predefined time domain occasions for transmission, such as at least one from SS/PBCH block, PDCCH and/or PDSCH of system information (e.g., SIBx), or paging.

In one example, the transmission burst is an uplink burst, and the segments in the uplink burst have predefined time domain occasions for transmission, such as at least one from RACH preambles, or scheduled uplink transmission burst.

In one example, if one of the directional sensing is busy, the corresponding transmission segment cannot be transmitted, and the resources corresponding to the transmission segment can be used for transmissions with direction sensed to be idle.

In one example, the scheduling of the resources corresponding to the cancelled transmission segment can be included in a previous transmitted segment, such as a PDCCH and/or PDSCH in the transmission segment. An illustration of this example is shown in 1402 of FIG. 14.

In one example, the resources corresponding to the cancelled transmission segment can be used for transmission according to the successful directions, and the scheduling information (e.g., included in DCI format carried by PDCCH) can be known to the receiver. An illustration of this example is shown in 1403 of FIG. 14.

Figure 15:
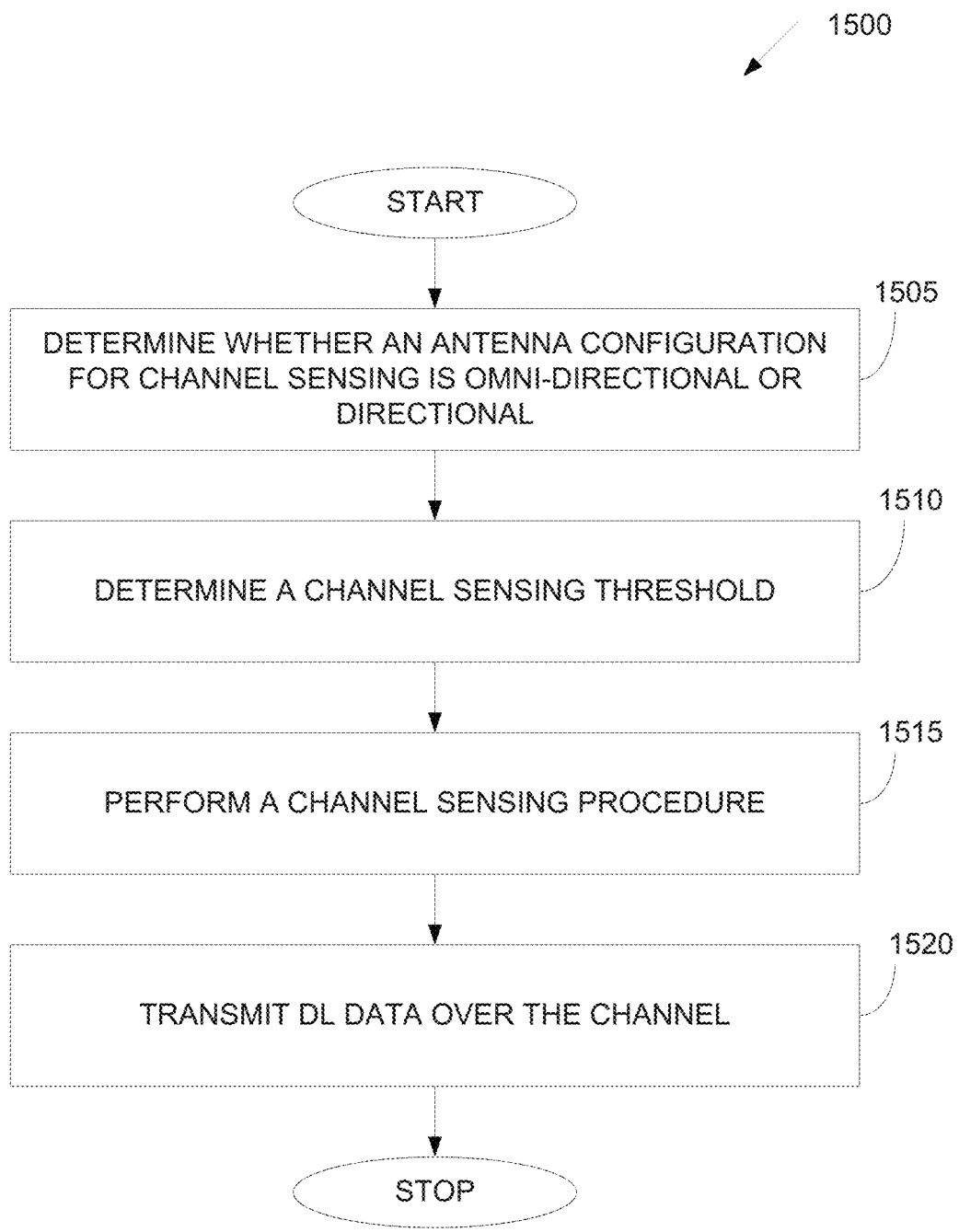
FIG. 15 illustrates a flow chart of a method for adapting channel sensing threshold according to embodiments of the present disclosure.

FIG. 15 illustrates a flow chart of a method for adapting a channel sensing threshold according to embodiments of the present disclosure, as may be performed by a UE (e.g., as 111-116 as illustrated in FIG. 1) and/or BS (e.g., BS 102 in FIG. 1).. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

In this embodiment, the method 1500 is performed in a wireless communication system operating with shared spectrum channel access by a UE or BS, collectively referred to as "the device." The method begins with the device determining whether an antenna configuration for channel sensing is omni-directional or directional (step 1505). For example, in step 1505, if the antenna configuration for channel sensing is determined to be directional, the device determines one or more beam directions for the antenna configuration and each beam direction is quasi-co-located (QCLed) with a reference signal. In some embodiments, the one or more beam directions for the antenna configuration for channel sensing are aligned with one or more beam directions for DL transmissions.

The device then determines a channel sensing threshold (step 1510). For example, in step 1510, the device may determine the channel sensing threshold based on two parts of channel sensing threshold. A first part of the channel sensing threshold is common for omni-directional and directional antenna configurations. A second part of the channel sensing threshold is dependent on the antenna configuration. In some embodiments, the second part of the channel sensing threshold is zero, if the antenna configuration is determined to be omni-directional. Additionally, the second part of the channel sensing threshold may be greater than zero, if the antenna configuration is determined to be directional.

Thereafter, the device performs a channel sensing procedure (step 1515). For example, in step 1515, the device performs a channel sensing procedure to determine whether the channel is idle based on the antenna configuration and the channel sensing threshold. In some embodiments, the channel is determined to be idle in the channel sensing procedure, if energy detection for each beam direction of the one or more beam directions is below the channel sensing threshold. The device then transmits DL data over the channel (step 1520). For example, in step 1520, the device transmits DL data over the channel if the channel is sensed as idle in the channel sensing procedure.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system including a shared spectrum channel, the UE comprising:
   a transceiver configured to receive system information; and
   a processor operably coupled to the transceiver, the processor configured to:
      identify, based on the system information, an indication indicating to perform a channel access procedure before transmissions; and
      before a first transmission of the transmissions, sense a first channel to access the shared spectrum channel based on a random sensing procedure of a type 1 channel access procedure using each beam of a plurality of beams, wherein the plurality of beams comprise a first beam and a second beam,
   wherein the transceiver is further configured to transmit the first transmission on the first channel sensed using the first beam among the plurality of beams, in case that the first channel is sensed as idle,
   wherein, before a second transmission of the transmissions, the processor is further configured to sense a second channel to access the shared spectrum channel based on a deterministic and non-zero duration sensing procedure of a type 2 channel access procedure using the second beam among the plurality of beams,
   wherein the transceiver is further configured to transmit the second transmission on the second channel sensed using the second beam switched from the first beam among the plurality of beams, in case that the second channel is sensed as idle, and
   wherein the first beam and the second beam are different beams.

2. The UE of claim 1, wherein:
   before a third transmission of the transmissions, the processor is further configured to sense a third channel to access the shared spectrum channel based on the random sensing procedure of the type 1 channel access procedure using a third beam among the plurality of beams, and
   the transceiver is further configured to:
      transmit the third transmission on the third channel sensed using the third beam, in case that the third channel is sensed as idle; and
      transmit a fourth transmission on the third channel sensed using the third beam.

3. The UE of claim 1, wherein:
   before a third transmission of the transmissions, the processor is further configured to sense a third channel to access the shared spectrum channel based on the random sensing procedure of the type 1 channel access procedure using a third beam among the plurality of beams;
   the transceiver is further configured to:
      transmit the third transmission on the third channel sensed using the third beam, in case that the third channel is sensed as idle; and
      transmit a fourth transmission on a fourth channel using a fourth beam; and
   the third beam and the fourth beam are different beams.

4. The UE of claim 1, wherein the processor is further configured to set an energy detection threshold to be less than or equal to a maximum energy detection threshold, for accessing at least one of the first channel or the second channel.

5. A method of a user equipment (UE) in a wireless communication system including a shared spectrum channel, the method comprising:
   receiving system information;
   identifying, based on the system information, an indication indicating to perform a channel access procedure before transmissions;
   before a first transmission of the transmissions, sensing a first channel to access the shared spectrum channel based on a random sensing procedure of a type 1 channel access procedure using each beam of a plurality of beams, wherein the plurality of beams comprise a first beam and a second beam;
   transmitting the first transmission on the first channel sensed using the first beam among the plurality of beams, in case that the first channel is sensed as idle;
   before a second transmission of the transmissions, sensing a second channel to access the shared spectrum channel based on a deterministic and non-zero duration sensing procedure of a type 2 channel access procedure using the second beam among the plurality of beams; and
   transmitting the second transmission sensed using the second beam switched from the first beam among the plurality of beams, in case that the second channel is sensed as idle,
   wherein the first beam and the second beam are different beams.

6. The method of claim 5, further comprising:
   before a third transmission of the transmissions, sensing a third channel to access the shared spectrum channel based on the random sensing procedure of the type 1 channel access procedure using a third beam among the plurality of beams;
transmitting the third transmission on the third channel sensed using the third beam, in case that the third channel is sensed as idle; and
transmitting a fourth transmission on the third channel sensed using the third beam.

7. The method of claim 5, further comprising:
before a third transmission of the transmissions, sensing a third channel to access the shared spectrum channel based on the random sensing procedure of the type 1 channel access procedure using a third beam among the plurality of beams;
transmitting the third transmission on the third channel sensed using the third beam, in case that the third channel is sensed as idle; and
transmitting a fourth transmission on a fourth channel using a fourth beam,
wherein the third beam and the fourth beam are different beams.

8. The method of claim 5, further comprising setting an energy detection threshold to be less than or equal to a maximum energy detection threshold, for accessing at least one of the first channel or the second channel.

9. A base station (BS) in a wireless communication system including a shared spectrum channel, the BS comprising:
a transceiver configured to transmit system information including an indication indicating to perform a channel access procedure before transmissions; and
a processor operably coupled to the transceiver, the processor configured to, before a first transmission of the transmissions, sense a first channel to access the shared spectrum channel based on a random sensing procedure of a type 1 channel access procedure using each beam of a plurality of beams, wherein the plurality of beams comprise a first beam and a second beam,
wherein the transceiver is further configured to transmit the first transmission on the first channel sensed using the first beam among the plurality of beams, in case that the first channel is sensed as idle,
wherein, before a second transmission of the transmissions, the processor is further configured to sense a second channel to access the shared spectrum channel based on a deterministic and non-zero duration sensing procedure of a type 2 channel access procedure using the second beam among the plurality of beams,
wherein the transceiver is further configured to transmit the second transmission on the second channel sensed using the second beam switched from the first beam among the plurality of beams, in case that the second channel is sensed as idle, and
wherein the first beam and the second beam are different beams.

10. The BS of claim 9, wherein:
before a third transmission of the transmissions, the processor is further configured to sense a third channel to access the shared spectrum channel based on the random sensing procedure of the type 1 channel access procedure using a third beam among the plurality of beams, and
the transceiver is further configured to:
transmit the third transmission on the third channel sensed using the third beam, in case that the third channel is sensed as idle; and
transmit a fourth transmission on the third channel sensed using the third beam.

11. The BS of claim 9, wherein:
before a third transmission of the transmissions, the processor is further configured to sense a third channel to access the shared spectrum channel based on the random sensing procedure of the type 1 channel access procedure using a third beam among the plurality of beams;
the transceiver is further configured to:
transmit the third transmission on the third channel sensed using the third beam, in case that the third channel is sensed as idle; and
transmit a fourth transmission on a fourth channel using a fourth beam; and
the third beam and the fourth beam are different beams.

12. The BS of claim 9, wherein the processor is further configured to set an energy detection threshold to be less than or equal to a maximum energy detection threshold, for accessing at least one of the first channel or the second channel.

13. A method of base station (BS) in a wireless communication system including a shared spectrum channel, the method comprising:
transmitting system information including an indication indicating to perform a channel access procedure before transmissions;
before a first transmission of the transmissions, sensing a first channel to access the shared spectrum channel based on a random sensing procedure of a type 1 channel access procedure using each beam of a plurality of beams, wherein the plurality of beams comprise a first beam and a second beam;
transmitting the first transmission on the first channel sensed using the first beam among the plurality of beams, in case that the first channel is sensed as idle;
before a second transmission of the transmissions, sensing a second channel to access the shared spectrum channel based on a deterministic and non-zero duration sensing procedure of a type 2 channel access procedure using the second beam among the plurality of beams; and
transmitting the second transmission sensed using the second beam switched from the first beam among the plurality of beams, in case that the second channel is sensed as idle,
wherein the first beam and the second beam are different beams.

14. The method of claim 13, further comprising:
before a third transmission of the transmissions, sensing a third channel to access the shared spectrum channel based on the random sensing procedure of the type 1 channel access procedure using a third beam among the plurality of beams;
transmitting the third transmission on the third channel sensed using the third beam, in case that the third channel is sensed as idle; and
transmitting a fourth transmission on the third channel sensed using the third beam.

15. The method of claim 13, further comprising:
before a third transmission of the transmissions, sensing a third channel to access the shared spectrum channel based on the random sensing procedure of the type 1 channel access procedure using a third beam among the plurality of beams;
transmitting the third transmission on the third channel sensed using the third beam, in case that the third channel is sensed as idle; and
transmitting a fourth transmission on a fourth channel using a fourth beam, wherein the third beam and the fourth beam are different beams.

16. The method of claim 13, further comprising setting an energy detection threshold to be less than or equal to a maximum energy detection threshold, for accessing at least one of the first channel or the second channel.

* * * * *